(12) United States Patent
Ritter (10) Patent No.: US 7,978,445 B2
(45) Date of Patent: Jul. 12, 2011

(54) SYSTEMS AND APPARATUS RELATING TO WIND TURBINE ELECTRICAL CONTROL AND OPERATION

(75) Inventor: Allen M. Ritter, Roanoke, VA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/650,807

(22) Filed: Dec. 31, 2009

(65) Prior Publication Data

US 2011/0134574 A1 Jun. 9, 2011

(51) Int. Cl.
*H02H 7/00* (2006.01)
*F03D 9/00* (2006.01)

(52) U.S. Cl. ............................ 361/18; 361/54; 290/44
(58) Field of Classification Search ........... 361/18, 361/54; 307/100; 290/44
See application file for complete search history.

(56) References Cited

U.S. PATENT DOCUMENTS

| | | | |
|---|---|---|---|
| 5,734,256 A * | 3/1998 | Larsen et al. | 323/207 |
| 6,021,035 A * | 2/2000 | Larsen et al. | 361/54 |
| 6,633,467 B2 | 10/2003 | Macbeth et al. | |
| 7,102,247 B2 * | 9/2006 | Feddersen | 290/44 |
| 7,394,166 B2 | 7/2008 | Teichmann et al. | |
| 7,586,216 B2 | 9/2009 | Li et al. | |
| 2009/0261589 A1 * | 10/2009 | Oohara et al. | 290/44 |
| 2010/0134935 A1 * | 6/2010 | Ritter et al. | 361/55 |

* cited by examiner

*Primary Examiner* — Ronald W Leja
(74) *Attorney, Agent, or Firm* — Mark E. Henderson; Ernest G. Cusick; Frank A. Landgraff (57) ABSTRACT

An electrical system for connecting a wind turbine to a power grid that includes: a frequency converter that converts electric power produced by a generator of the wind turbine into electric power that is synchronized with the electric power of the power grid; a transformer that steps up the voltage for connection to the power grid, the transformer being disposed between the frequency converter and a connection to the power grid; and a grid-side crowbar circuit; wherein the grid-side crowbar circuit is configured to apply a short circuit to the electrical system upon the detection of a fault.

20 Claims, 7 Drawing Sheets

SYSTEMS AND APPARATUS RELATING TO WIND TURBINE ELECTRICAL CONTROL AND OPERATION

BACKGROUND OF THE INVENTION

This present application relates generally to systems and apparatus for controlling the operation of wind turbines. More specifically, but not by way of limitation, the present application relates to systems and apparatus pertaining to improved detection of and protection from electrical faults during the operation of wind turbines.

Wind turbines compete with traditional forms of electric power generation. As a result they depend on cost effective, reliable, as well as safe means for capturing wind energy and converting it into electrical energy that may be delivered to distant locations for usage. In general, medium voltage is used to collect electric power from the several connected wind turbines that make up a wind farm facility. A fused disconnect (or other current interrupting device) is typically used to disconnect the individual wind turbines from the other turbines within the facility. More particularly, a fused medium voltage disconnect is generally located between the medium voltage and the step-up transformer. In such systems, the fused disconnects typically are coordinated with wind turbine equipment short circuits.

However, many types of wind turbine faults exist that do not produce short circuits. Indeed, some short circuits produce very little fault current. In addition, some wind turbine electric faults cause temporary or short-lived high currents. These types of currents, however, are fairly typical in wind turbine applications because the maintenance of voltage in the systems requires wind turbines to provide high currents at times. As a result, wind turbine fuses are designed to allow for relatively high currents. This, of course, makes them poor at detecting faults that result in only moderately high currents conditions. These characteristics mean that, typically, the electrical system of wind turbines are ill-equipped at detecting faults that result in anything less than the current produced by a bolted fault.

As one of ordinary skill in the art will appreciate, delays in the detection or outright failure of detection can cause extensive equipment damage in wind turbines. As a result, improved systems and apparatus for detecting and disconnecting fault currents in wind turbine applications are needed. Such improved systems would be able to detect and disconnect various faults that produce fault currents below fuse interrupting currents and other potentially damaging faults.

BRIEF DESCRIPTION OF THE INVENTION

The present application thus describes an electrical system for connecting a wind turbine to a power grid that includes: a frequency converter that converts electric power produced by a generator of the wind turbine into electric power that is synchronized with the electric power of the power grid; a transformer that steps up the voltage for connection to the power grid, the transformer being disposed between the frequency converter and a connection to the power grid; a grid-side crowbar circuit; wherein the grid-side crowbar circuit is configured to apply a short circuit to the electrical system upon the detection of a fault.

The present application further describes an electrical system that includes a generator that is driven by a wind turbine; a frequency converter that converts electric power produced by the generator of the wind turbine into electric power that is synchronized with the electric power of the power grid; a transformer that steps up the voltage for connection to the power grid, the transformer being disposed between the frequency converter and a connection to the power grid; a grid-side crowbar circuit that is disposed between the frequency converter and the connection to the power grid; and a transformer circuit-interrupting device disposed between the transformer and the connection to the power grid; wherein the grid-side crowbar circuit is configured to apply a short circuit to the electrical system upon the detection of a fault.

These and other features of the present application will become apparent upon review of the following detailed description of the preferred embodiments when taken in conjunction with the drawings and the appended claims.

BRIEF DESCRIPTION OF THE DRAWINGS

These and other features of this invention will be more completely understood and appreciated by careful study of the following more detailed description of exemplary embodiments of the invention taken in conjunction with the accompanying drawings, in which.

DETAILED DESCRIPTION OF THE INVENTION

As used herein, the terms "disturbance," "short", "fault," "system fault," "transient", "high-voltage anomaly", "high-current anomaly", and other similar terms that describe unintended perturbations in an electrical system that may damage components and/or cause other negative performance issues. Examples of events that may cause such disturbances (which, as used herein, will be commonly referred to as "faults") in wind turbine electrical components and the grid signal are well known and not discussed further herein. It will also be appreciated that conventional technology provides many types of components, systems and methods that may be used to detect the presence of such faults in an electrical system. In addition, while a typical electric generator produces a three-phase electric signal, it should be recognized that discussion of a three-phase signal is for convenience and illustration purposes only, and not limiting of the teachings herein. For example, the teachings herein may be applied to single phase, two phase and other multi-phase or poly-phase signals.

Figure 1:
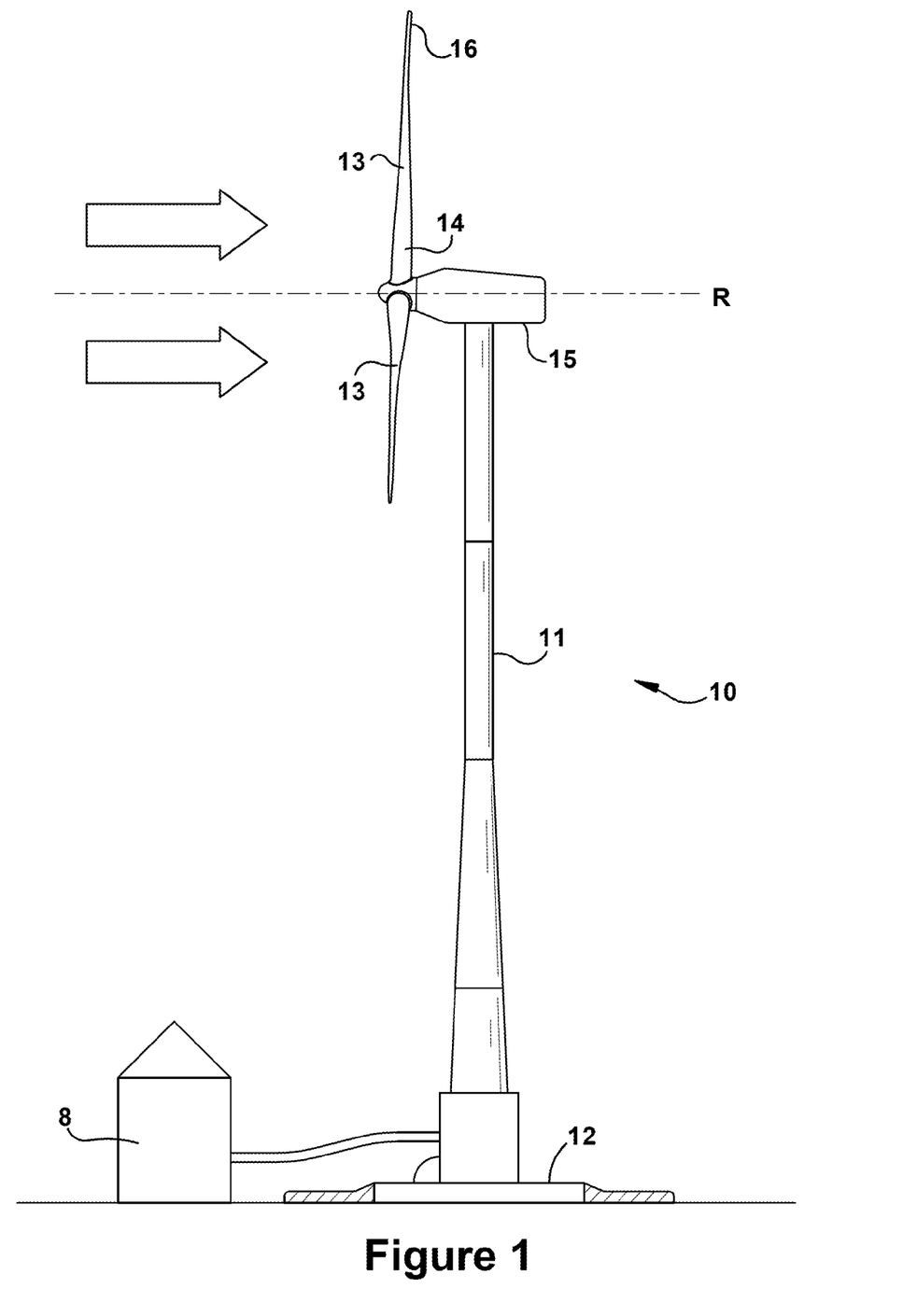
FIG. 1 is a schematic representation of wind turbine in which exemplary embodiments of the present application may be used.

Referring to FIG. 1, there is shown an exemplary wind driven turbine 10. In this embodiment, the turbine 10 includes a tower 11 having a base 12 for securing the turbine 10 to the terrain. At least one to many rotor blades 13, each one having a root 14 and a tip 16, are coupled to a nacelle 15 that is in turn coupled to the tower 11. During operation, wind (illustrated by the arrows pointing from left to the right) impinges upon the rotor blades 13 causing rotation of the rotor blades 13 about an axis of rotation R. In the non-limiting examples discussed herein, the mechanical energy generated by the rotation of the rotor blades 13 is converted by systems within the nacelle 15 to produce electrical output. Also depicted in FIG. 1 is a support facility 8. The support facility 8 includes additional resources as needed and for purposes herein, is considered to be a part of the wind turbine 10. For example, in some embodiments, the support facility 8 includes various power converters, energy storage units, user interfaces and other such equipment.

Figure 2:
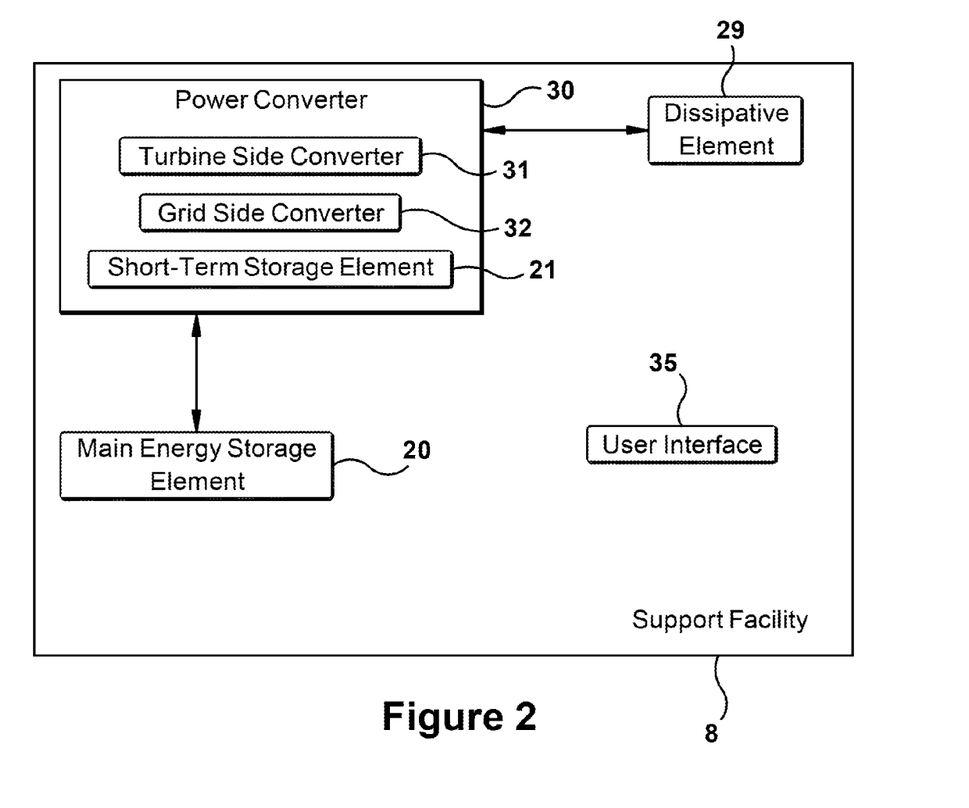
FIG. 2 is schematic representation of the components of a support facility as may be used with the wind turbine of FIG. 1.

More particularly, as shown in FIG. 2, the support facility 8 may includes a main power converter 30. In this embodiment, the power converter 30 includes a turbine side converter 31 and a grid-side converter 32. The power converter 30 provides for conversion of power produced by a generator of the wind turbine 10 to power that is synchronized with power of the electrical power grid (or "grid"). The support facility 8 also may include a short-term energy storage element 21, a main energy storage element 20 and a dissipative element 29. Exemplary energy storage elements 20, 21 include various forms of batteries. Other devices may be used as well. The short-term storage element 21 generally is provided for transient support. The dissipative element 29 may include a variety of devices. For example, the dissipative element 29 may be a resistor (such as a dump load resistor). The dissipative element 29 is used to provide a power balance between wind power and load power requirements by dissipating excess energy that cannot be stored in the short-term storage element 21 of the power converter 30 (or the main energy storage element 20). A user interface 35 (e.g., a local control panel or a control room) may be included in the support facility 8 to provide for aspects such as operator control over the wind turbine 10 and manual entry of commands.

Figure 3:
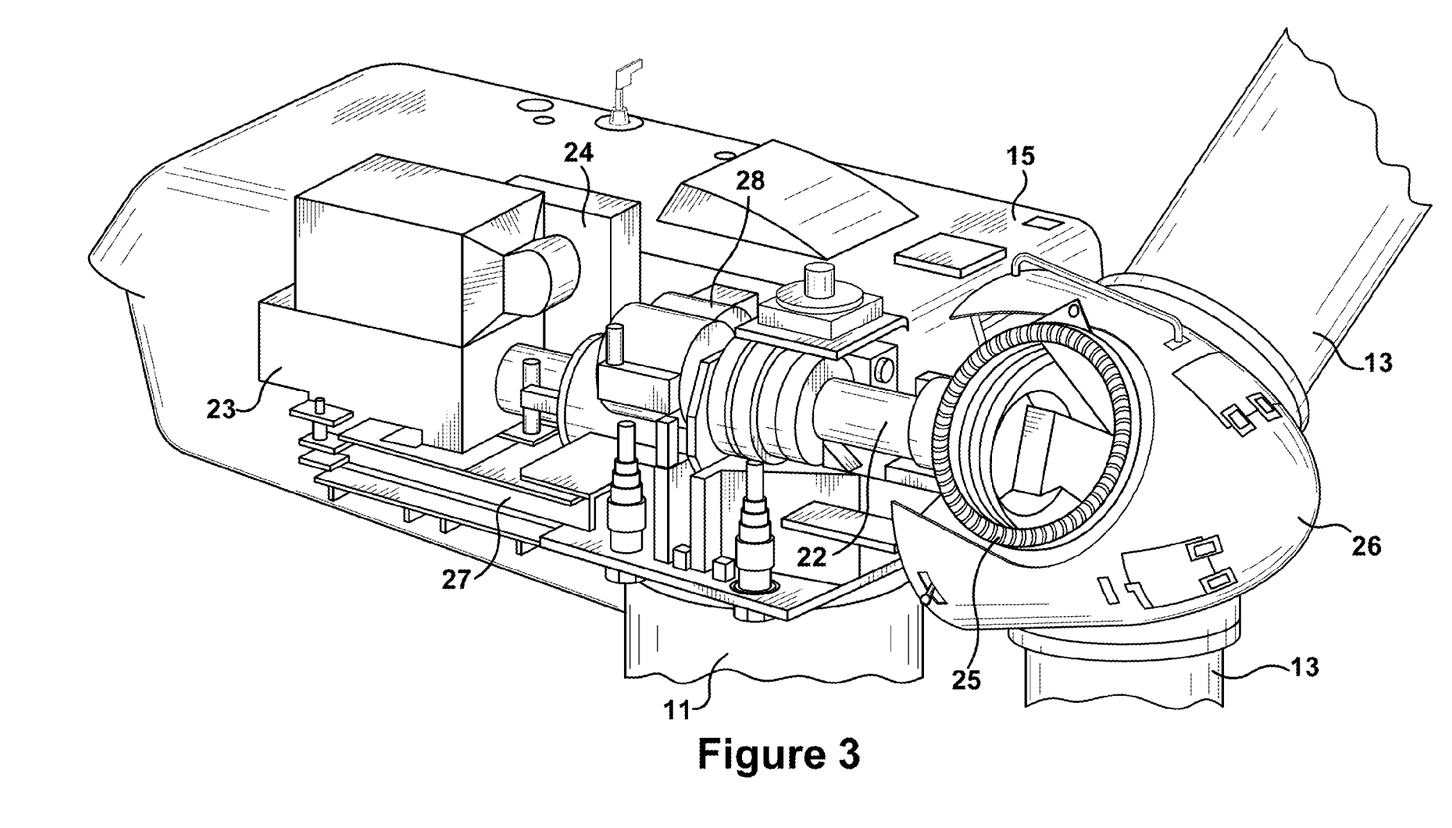
FIG. 3 is a cutaway view of an exemplary nacelle of the wind turbine of FIG. 1.

FIG. 3 is a cutaway view of an exemplary nacelle 15 illustrating selected components therein. Shown in FIG. 3 are rotor blades 13 each of which are coupled at the root thereof to a rotor hub 25. A nose cone 26 provides streamlining for the hub 25 and other components. The rotor hub 25 is coupled within the nacelle 15 to a main shaft 22 that drives a gearbox 28 and, in turn, a generator 23. The generator 23 provides a supply of electricity to service an electrical grid. The grid includes distribution systems as are known in the art and is generally not discussed in greater detail herein. Aspects of the operation of the turbine 10 are managed through a control system 24. In this embodiment, the foregoing components and various other components are coupled to a main frame 27 within the nacelle 15. It will be appreciated that other configurations are possible.

Figure 4:
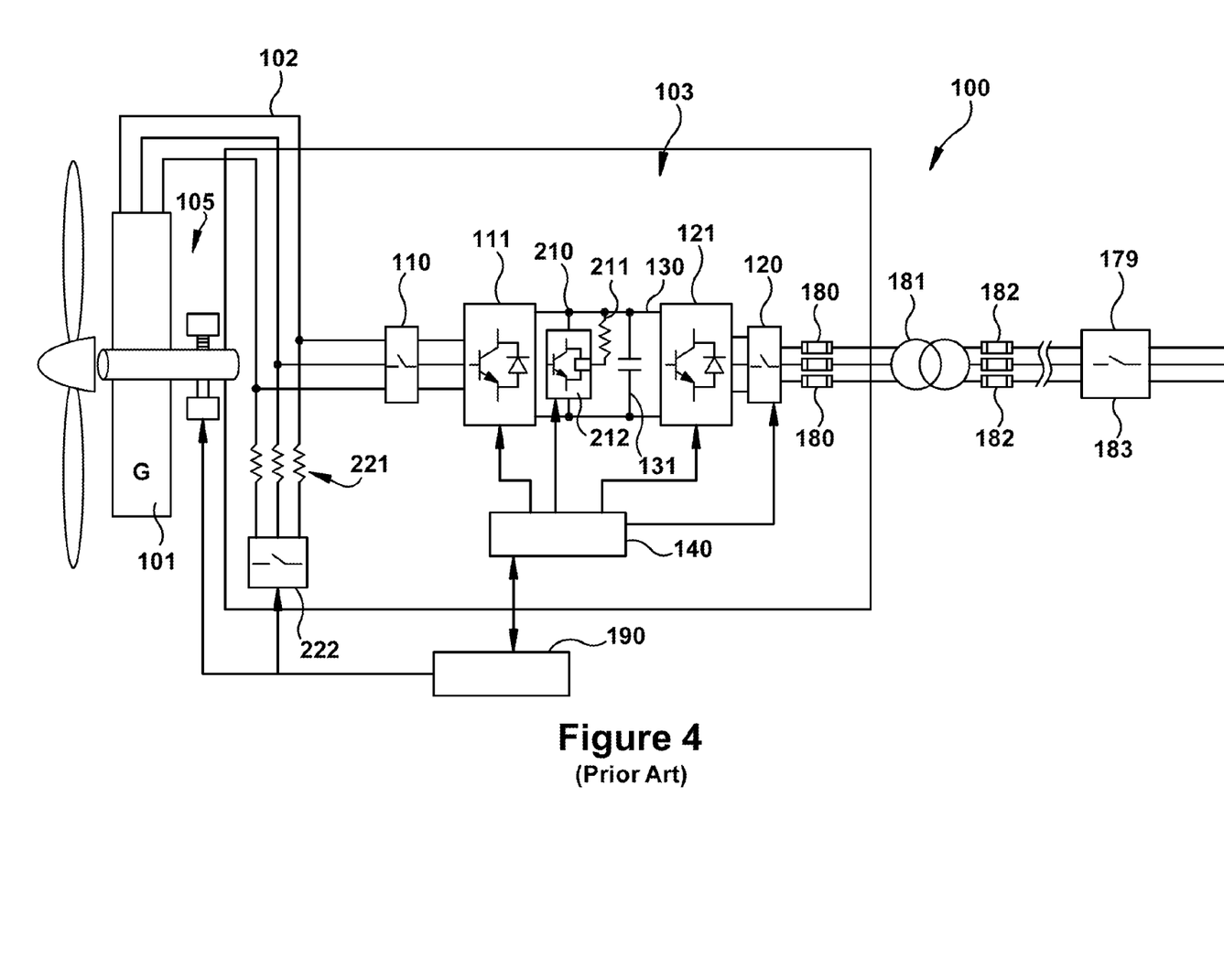
FIG. 4 is a schematic representation of a conventional electrical system that may be used in connecting the generator of a wind turbine to a power grid.

Referring now to FIG. 4, exemplary aspects of a wind turbine system 100 according to conventional technology are shown. The wind turbine system 100 may include a generator 101 coupled to a stator bus 102, which then is coupled to a frequency converter 103. The frequency generator 103 then may be coupled to the grid 179 via the components and connections shown. Relating to the several electrical lines, components and connections that couple the generator 101 to the grid 179, it will be appreciated that the terms "generator-side" and "grid-side" may be used to indicate the relative position of one component to another as well as the general position of a component within the circuitry of the system. As such (and as used herein), for example, a component being described as located to the "generator-side" of a connection indicates that the component is located between the connection and the generator 101. Likewise, for example, a component being described as located to the "grid-side" of a connection indicates that the component is located between the connection and the grid 179. In addition, as stated, these terms may also refer to a component's general location in the circuitry. Accordingly, the "generator-side" of the system refers to the circuitry and components located between the generator 101 and the power converter 103. And, the "grid-side" of the system refers to the circuitry and components located between the power converter 103 and the location of the connection the system makes to the grid 179.

The frequency converter 103 (also referred to as an "electric power converter") includes various components for producing an electric signal that is synchronized with the electric grid 179. Non-limiting examples of components associated with the frequency converter 103 include a generator contactor 110 that is coupled to the stator bus 102 and a generator-side converter 111. The generator-side converter 111 receives an alternating current (AC) input signal from the generator 101 and provides for conversion of the electrical input to a direct current (DC) signal. The generator-side converter 111 provides the DC signal to a grid-side converter 121 through a DC bus 130. The grid-side converter 121 converts the DC signal to an AC output signal that is suited for feeding the electric grid 179. Feeding the electric grid 179 occurs through a line contactor 120. Operation of at least some of the various components in the frequency converter 103 is governed by a converter control unit 140.

Also included in the wind turbine 100 may be a dynamic brake 210, and a dump load resistor 221 may be engaged by a dump load contactor 222. The dynamic brake 210 may be coupled to the converter control unit 140 for controlling the operation thereof. In this illustration, the dump load resistor 221 and the generator contactor 110 may be coupled in parallel to the stator bus 102. The operation of the wind turbine system 100, as depicted in this illustration, may be governed by a wind turbine control unit 190. The various contactors of the wind turbine 100 perform switching functions as are known in the art. In this illustration, the generator 101 includes a braker unit 105 for braking of the generator 101.

Coupling to the electric grid 179 from the frequency converter 103 typically involves use of a current-interrupting device 180 (which may include a fuse, circuit breaker, or the like), a grid-coupling transformer 181, a transformer current-interrupting device 182 (which may include a fuse, circuit breaker, or the like) and a main switch 183. It will be appreciated that, although these components are depicted as separate, the transformer 181 and the transformer current-interrupting device 182 generally are integrated.

It will be appreciated that the dynamic brake 210, the mechanical braker 105, and the dump load contactor 222 provide a level of protection to the wind turbine system 100 in the case of a fault. In addition, the current interrupting device 180 provides some protection against faults occurring on the generator-side of the system, and the transformer current interrupting device 182 provides some protection to the components on the grid-side of the system. As discussed in more detail below, the protection provided via this conventional arrangement is inadequate given the nature of some faults that occur in the electrical systems of wind turbines, particularly those that occur between the grid connection and the frequency converter 103 that do not produce high-levels of fault current. Note that, as will be appreciated by one of ordinary skill in the art, some of the various components depicted in FIGS. 1-4 are considered incidental to the teachings herein.

Accordingly, these and other components are generally not introduced or discussed further herein.

Figure 5:
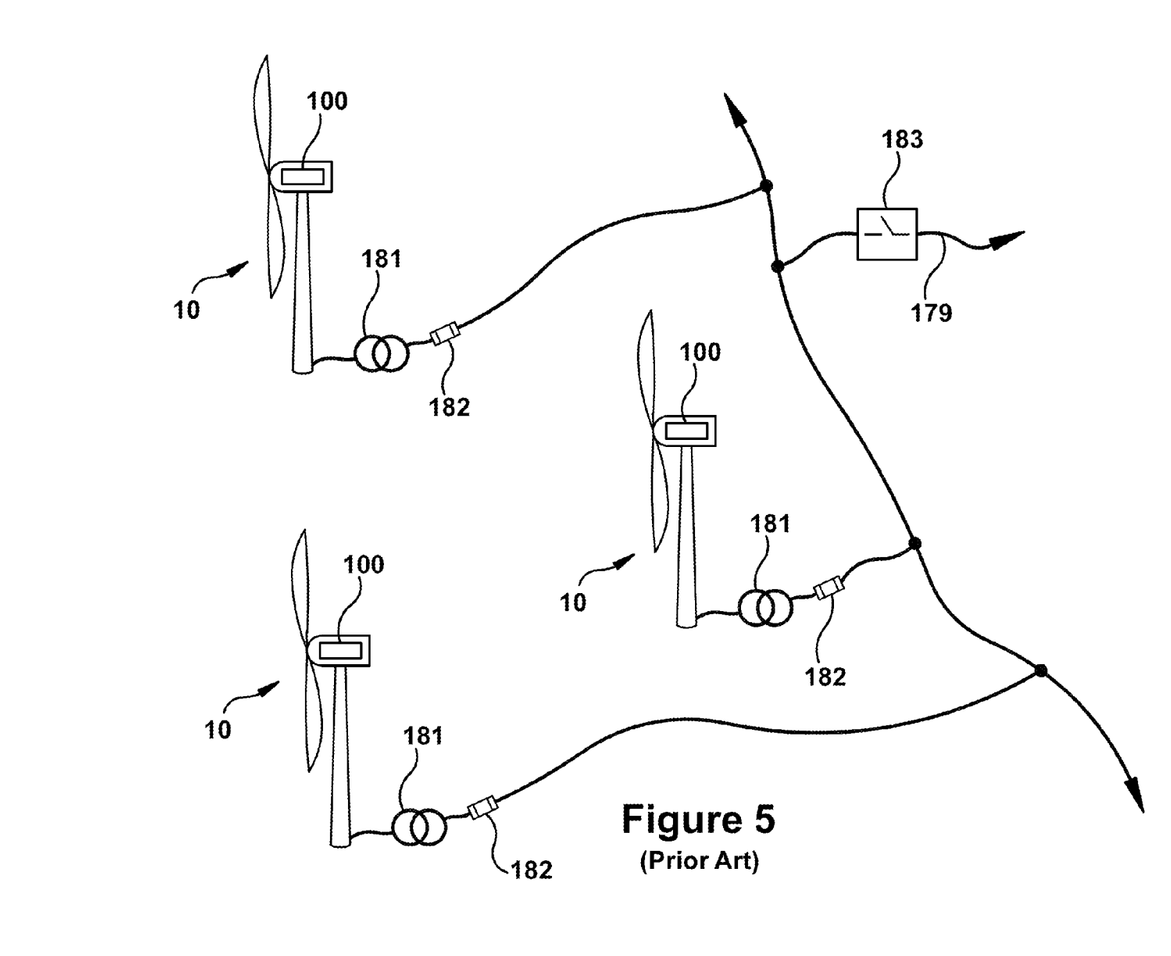
FIG. 5 is a schematic representation of the electrical connections that may be made to connect a single or multiple wind turbines to a power grid.

Referring now to FIG. 5, a simplified representation of a wind turbine 10 electrical network is provided depicting a plurality of wind turbines 10 as they may be electrically linked and connected to the grid 170. As shown, each of the wind turbines 10 may form a connection to the grid feed via a connection to a transformer 181 and a current interrupting device 182 (for example, a fuse or circuit breaker). The wind turbine 10 may connect electrically to the transformer 181 and the circuit-interrupting device 182 and, from there, vias a line that may be used by several wind turbines 10, to the main switch 183. The main switch 183 connects the circuit to the grid 179.

It will be appreciated that the "grid-side" of the conventional system depicted in FIGS. 4 and 5 relies primarily on the transformer current interrupting device 182 to protect the grid-side circuitry and components from faults and provide a disconnect from the other wind turbines 10 in the network. That is, while other protection devices may exist on the generator-side of the frequency converter 103 (as described above), the transformer circuit-interrupting device 182 generally comprises the fault protection that is present between the medium voltage of the wind turbine unit and the transformer (i.e., between the frequency converter 103 and the step-up transformer 181) and in the circuitry beyond the transformer 181 to the grid connection. Due to this location, the transformer circuit-interrupting device 182 generally comprises a fused medium voltage disconnect. More specifically, the fuse 180 generally comprises a fused medium voltage disconnect that is coordinated with wind turbine equipment and the typically operation thereof. It will be appreciated that the transformer circuit-interrupting device 182 is meant to protect the wind turbine against faults and act to disconnect the individual wind turbines from the other turbines within the facility in case of faults.

However, as described, many types of wind turbine faults do not produce a high level of fault current. In addition, some wind turbine electric faults cause temporary or short-lived high currents, which go unnoticed by the transformer circuit-interrupting device 182 because such short-lived high currents are not uncommon and, actually, necessary for the maintenance of adequate voltage levels in the system. That is, because the maintenance of voltage in the wind turbine electrical systems requires wind turbines to provide high currents at times, the transformer circuit-interrupting device 182 is configured to allow for high currents. This, of course, makes them poor at detecting faults that result in only low to moderate levels of fault current (and, in some cases, even high levels of fault current). As one of ordinary skill in the art will appreciate, faults of this nature occur and, though they do not produce high levels of fault current, may damage electrical components of the system.

Figure 6:
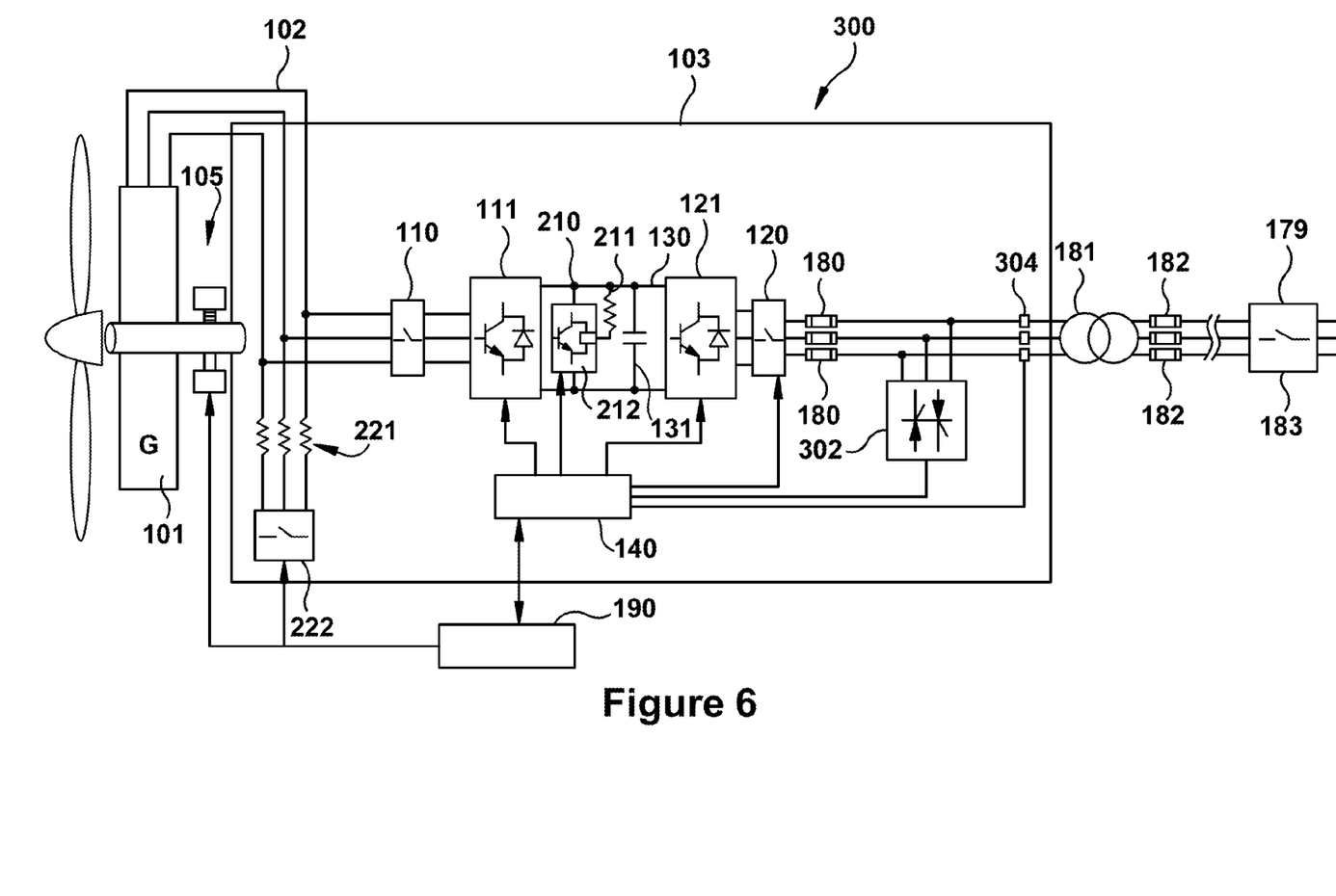
FIG. 6 is a schematic representation of an electrical system that may be used in connecting the generator of a wind turbine to a power grid according to an exemplary embodiment of the present application.
Figure 7:
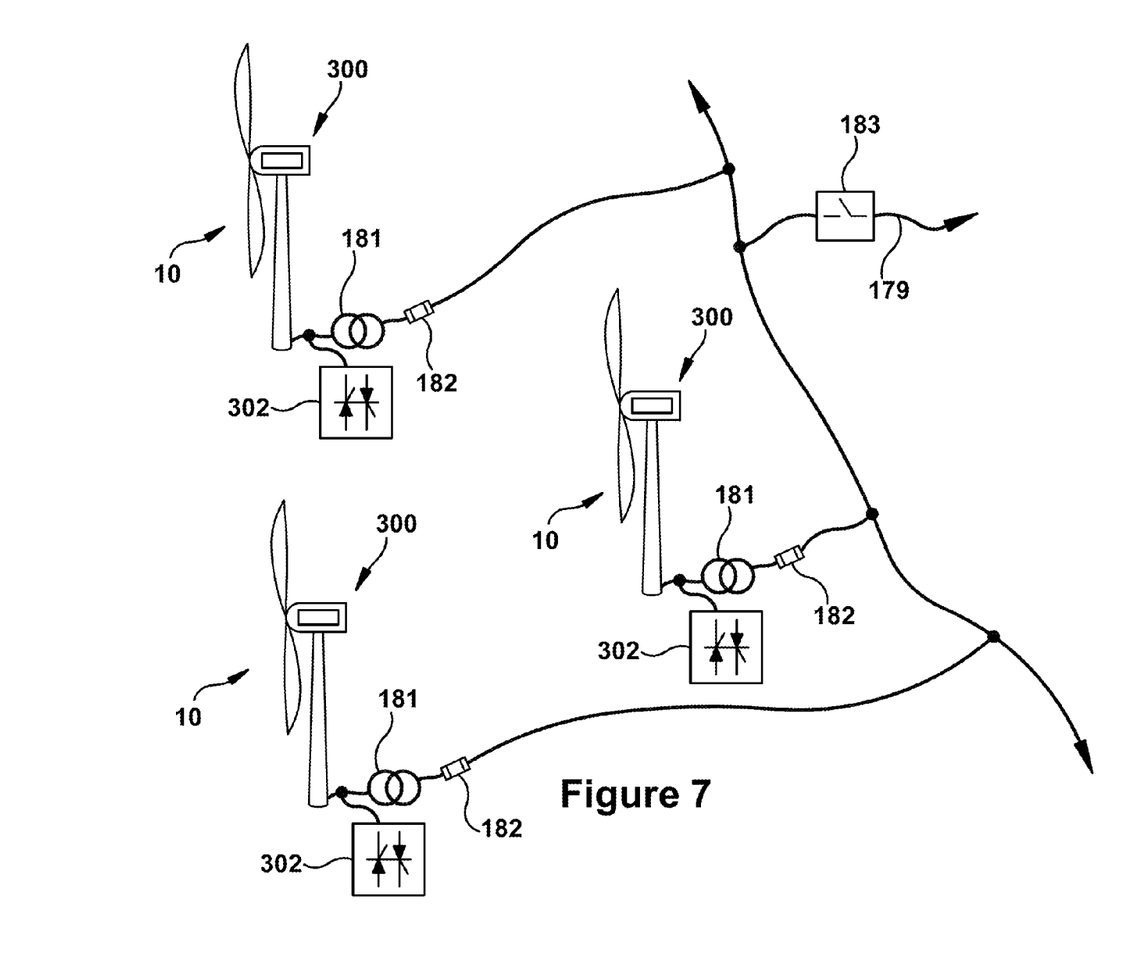
FIG. 7 is schematic representation of the electrical connections that may be made to connect a single or multiple wind turbines to a power grid according to an exemplary embodiment of the present application.

Referring to the subsequent figure, FIGS. 6 and 7 provide a wind turbine electrical system 300 that includes a grid-side crowbar circuit 302 in accordance with an exemplary embodiment of the present application. As will be appreciated, a crowbar circuit is an electrical circuit used to prevent an overvoltage condition from damaging the circuits and components of an electrical system. In general, a crowbar circuit operates by putting a short circuit or low resistance path across the voltage source. Crowbar circuits are frequently implemented using a thyristor (also called an SCR) or a trisil or thyratron as the shorting device, though the grid-side crowbar circuit 302 may be implemented with any type of commercially available crowbar circuit or the like. Crowbar circuits typically operate by detecting whether a trigger voltage is surpassed. Once the trigger voltage is surpassed, the crowbar circuit provides the short circuit path that then pulls the voltage below the trigger level, typically, close to ground. Once triggered, crowbar circuits depend on the current limiting or current interrupting circuitry of the power supply, line fuses, or circuit breakers to disconnect the power supply. It will be appreciated that an active crowbar circuit is one that can remove the short circuit when the fault or transient event is over, thus allowing the system to resume normal operation. Active crowbars generally use a transistor, gate turn off (GTO) thyristor or forced commutated thyristor instead of a thyristor to short the circuit. According to embodiments of the present application, the grid-side crowbar circuit 300 may comprise an active crowbar circuit or a passive one.

The location of the grid-side crowbar circuit 302 of the present application is defined as being on the "grid-side" of the frequency converter 103, which may also be described as between the power converter 103 and the connection the system makes with the grid 179 at the main switch 183. More particularly, in preferred embodiments, the grid-side crowbar circuit 302 may be described as being disposed between the frequency converter 103 and the transformer circuit-interrupting device 182. Even more particularly, the grid-side crowbar circuit 183 may be described as being disposed between the current interrupting device 180 and the transformer 181.

The grid-side crowbar circuit 302 may be controlled, at least in part, by the converter control unit 140 or, for that matter, any component that can provide the same function as the converter control unit 140 is described herein as providing in relation to the grid-side crowbar circuit 302. It will be appreciated that, pursuant to commercially available and conventional technologies, the converter control unit 140 may be configured to detect electrical faults that occur within the system 300 pursuant to any conventional fault detection system, method, or product. As stated, the term "fault" refers to any electrical disturbance, short, fault, system fault, transient, high-voltage anomaly, high-current anomaly, and other similar terms that describe unintended electrical perturbations in an electrical system that may damage components and/or cause other negative performance issues. As one of ordinary skill in the art will appreciate, numerous systems and methods are available that may be used to detect faults in electrical systems, particularly those associated with electrical generators. Many examples of these are discussed in the following General Electric patents: U.S. Pat. No. 7,102,355, U.S. Pat. No. 7,383,165, and U.S. Pat. No. 7,528,611 and the patents referenced therein, all of which are incorporated in their entirety by the present application.

Pursuant to aspects of some of the above methods of detecting electrical faults provided above, in some embodiments of the present application, current sensors 304 that measure current level and other aspects of the current flowing through a power line are included. The current sensors 304 may be configured to communicate the data relating to the measurements taken to the converter control unit 140. The current sensors 304 may be located between the frequency converter 103 and the transformer 181. More preferably, the current sensors 304 may be located between the grid-side crowbar circuit 302 and the transformer 181, as shown in FIG. 6. As stated, the current sensors 304 may provide information relating to current level to the frequency converter 103 so that faults may be detected.

The operation of system 300 may include the following.

The grid-side crowbar circuit 302 may be located as described above and configured to activate a short circuit when a trigger voltage is exceeded. Particularly, an electrical fault that produces a voltage above the trigger voltage occurs in the system 300. As described, this may occur even though the current associated with the fault remains well below the current required to trip the transformer circuit interrupting devices 182. For example, as will be appreciated, a fault may occur that is fed from the grid, i.e., the fault is sustained by voltage from the grid. This fault may place a high voltage across the crowbar circuit 302 that exceeds the trigger voltage of the circuit. With the trigger voltage for the grid-side crowbar circuit 302 exceeded, the grid-side crowbar circuit 302 operates to create a short circuit, as described above, which may include shorting the circuit to ground. It will be appreciated by one of ordinary skill in the art that taking the fault voltage to ground via the triggering of the crowbar circuit 302 may protect grid-side and other electrical components without also triggering a circuit interrupting device.

In some embodiments, the triggering of the crowbar circuit 302 may be used to activate the transformer circuit-interrupting device 182 so that the fault current is interrupted. That is, the fault voltage that triggered the crowbar circuit 302 causes a high fault current as the crowbar circuit 302 removes substantially all of the resistance from the voltage source. With the relative position of the transformer circuit-interrupting device 182 and the grid-side crowbar circuit 302, this fault current travels through transformer circuit-interrupting device, thereby causing it to interrupt the current flowing therethrough and electrically disconnecting the system 300 from the other wind turbines 10 and the grid 179. In this manner, fault voltage and/or current may be interrupted before damage or, at least, extensive damage to the system is wrought.

In another form of operation, the converter control unit 140 or like component may be configured to detect a type of fault or several types of faults that frequently occur in the electrical systems of wind turbines and, once detected, function to activate the crowbar circuit 302. Particularly, using the current data provided by current sensors 304 as well as other data that may be provided via conventional sensors, the converter control unit 140 detects a fault. As discussed above, this may be done pursuant to the operation of any conventional fault-detecting technologies and that the fault may include any detectable electric anomaly. For example, the measured current may detect a current that is not responsive to the power output of the generator. Once the fault is detected, the converter control unit 140 may operate so that a voltage is applied across the grid-side crowbar circuit 302 that is above the trigger voltage for the circuit 302. At this point, with the crowbar circuit 302 triggered, the system 300 may operate as discussed above.

As one of ordinary skill in the art will appreciate, the many varying features and configurations described above in relation to the several exemplary embodiments may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

I claim:

1. An electrical system for connecting a wind turbine to a power grid, the electrical system comprising:
   a frequency converter that converts electric power produced by a generator of the wind turbine into electric power that is synchronized with the electric power of the power grid;
   a transformer that steps up the voltage for connection to the power grid, the transformer being disposed between the frequency converter and a connection to the power grid; and
   a grid-side crowbar circuit;
   wherein the grid-side crowbar circuit is configured to apply a short circuit to the electrical system upon the detection of a fault.

2. The electrical system for connecting a wind turbine to a power grid according to claim 1, wherein the grid-side crowbar circuit comprises a crowbar circuit disposed between the frequency converter and the connection to the power grid.

3. The electrical system for connecting a wind turbine to a power grid according to claim 1, wherein the grid-side crowbar circuit comprises a crowbar circuit disposed between the frequency converter and the transformer.

4. The electrical system for connecting a wind turbine to a power grid according to claim 3, further comprising a transformer circuit-interrupting device.

5. The electrical system for connecting a wind turbine to a power grid according to claim 4, wherein the transformer circuit-interrupting device comprises one of a fuse and a circuit breaker.

6. The electrical system for connecting a wind turbine to a power grid according to claim 4, wherein the transformer circuit-interrupting device is disposed between the transformer and the connection to the power grid.

7. The electrical system for connecting a wind turbine to a power grid according to claim 6, wherein the short circuit comprises one that is anticipated to activate the transformer circuit-interrupting device such that the transformer circuit-interrupting device interrupts the current flowing therethrough.

8. The electrical system for connecting a wind turbine to a power grid according to claim 1, wherein the fault comprises a fault that is fed by grid voltage.

9. The electrical system for connecting a wind turbine to a power grid according to claim 1, wherein the detection of a fault comprises a predetermined voltage being applied by the electrical system across the grid-side crowbar circuit, wherein the predetermined voltage level exceeds a trigger voltage level of the crowbar circuit.

10. The electrical system for connecting a wind turbine to a power grid according to claim 1, further comprising a converter control unit that is configured to detect the fault and, upon detection, cause a predetermined voltage level to be applied across the grid-side crowbar circuit, wherein the predetermined voltage level exceeds a trigger voltage level of the crowbar circuit.

11. The electrical system for connecting a wind turbine to a power grid according to claim 10, further comprising circuit sensors disposed between the frequency converter and the transformer.

12. The electrical system for connecting a wind turbine to a power grid according to claim 11, wherein the circuit sensors disposed between the grid-side crowbar circuit and the transformer; and wherein the circuit sensors are configured to take measurements relating to the characteristics of current flowing through line at that location and to communicated data relating to the current measurements to the converter control unit.

13. The electrical system for connecting a wind turbine to a power grid according to claim 12, wherein the converter control unit uses the data relating to the current measurements to detect the fault.

14. An electrical system comprising:
a generator that is driven by a wind turbine;
a frequency converter that converts electric power produced by the generator of the wind turbine into electric power that is synchronized with the electric power of the power grid;
a transformer that steps up the voltage for connection to the power grid, the transformer being disposed between the frequency converter and a connection to the power grid;
a grid-side crowbar circuit that is disposed between the frequency converter and the connection to the power grid; and
a transformer circuit-interrupting device disposed between the transformer and the connection to the power grid;
wherein the grid-side crowbar circuit is configured to apply a short circuit to the electrical system upon the detection of a fault.

15. The electrical system according to claim 14, wherein the transformer circuit-interrupting device comprises one of a fuse and a circuit breaker.

16. The electrical system according to claim 14, wherein the short circuit comprises one that is anticipated to activate the transformer circuit-interrupting device such that the transformer circuit-interrupting device interrupts the current flowing therethrough.

17. The electrical system according to claim 14, wherein the fault comprises a fault that is fed by grid voltage.

18. The electrical system according to claim 14, wherein the detection of a fault comprises a predetermined voltage being applied by the electrical system across the grid-side crowbar circuit, wherein the predetermined voltage level exceeds a trigger voltage level of the crowbar circuit.

19. The electrical system according to claim 14, further comprising a converter control unit that is configured to detect the fault and, upon detection, cause a predetermined voltage level to be applied across the grid-side crowbar circuit, wherein the predetermined voltage level exceeds a trigger voltage level of the crowbar circuit.

20. The electrical system according to claim 19, further comprising circuit sensors disposed between the frequency converter and the transformer;
wherein the circuit sensors disposed between the grid-side crowbar circuit and the transformer; and wherein the circuit sensors are configured to take measurements relating to the characteristics of current flowing through line at that location and to communicated data relating to the current measurements to the converter control unit; and
wherein the converter control unit uses the data relating to the current measurements to detect the fault.

* * * * *